US007624659B2

(12) United States Patent
Futamura et al.

(10) Patent No.: US 7,624,659 B2
(45) Date of Patent: Dec. 1, 2009

(54) SHIFT POSITION SENSOR OF AUTOMATED MANUAL TRANSMISSION

(75) Inventors: Makoto Futamura, Kanagawa (JP); Masasumi Kitou, Nagoya (JP)

(73) Assignees: Nissan Motor Co., Ltd., Yokohama-shi (JP); Aichi Machine Industry Co., Ltd., Nagoya-shi (JP)

( * ) Notice: Subject to any disclaimer, the term of this patent is extended or adjusted under 35 U.S.C. 154(b) by 427 days.

(21) Appl. No.: 11/497,533

(22) Filed: Aug. 2, 2006

(65) Prior Publication Data

US 2007/0028709 A1 Feb. 8, 2007

(30) Foreign Application Priority Data

Aug. 3, 2005 (JP) ............................. 2005-225380

(51) Int. Cl.
*F16H 59/00* (2006.01)
*H01L 43/06* (2006.01)

(52) U.S. Cl. ................... 74/335; 324/207.22

(58) Field of Classification Search ................ 74/335, 74/339, 473.11, 473.36; 701/64; 324/207.11, 324/207.22, 207.24
See application file for complete search history.

(56) References Cited

U.S. PATENT DOCUMENTS 4,376,272 A * 3/1983 Osakabe et al. ............ 335/211
5,038,627 A * 8/1991 Schwaiger et al. ............ 74/335
5,450,009 A * 9/1995 Murakami .............. 324/207.21
5,514,961 A * 5/1996 Stoll et al. .............. 324/207.13
5,743,143 A * 4/1998 Carpenter et al. ............. 74/335
6,753,680 B2 * 6/2004 Wolf ........................ 324/207.2
2004/0263155 A1* 12/2004 Schroeder et al. ....... 324/207.12
2006/0011008 A1* 1/2006 Hara et al. ................ 74/473.36
2007/0216402 A1* 9/2007 Blessing et al. ........ 324/207.24

FOREIGN PATENT DOCUMENTS

EP          0498918 A1 *  8/1992
JP          8-320054 A    12/1996

OTHER PUBLICATIONS

English translation of EP0498918A1, Feb. 12, 2009, http://epo.worldlingo.com.*

* cited by examiner

*Primary Examiner*—Roger Pang
(74) *Attorney, Agent, or Firm*—Foley & Lardner LLP

(57) ABSTRACT

An automated manual transmission to which a shift position sensor of the present invention is practically applied has a hydraulic shift actuator that includes a cylinder and a piston that moves in the cylinder in accordance with a speed change operation of the transmission. The shift position sensor comprises a magnet mounted in the piston to move therewith, and a magnaflux detector mounted to a fixed member of the transmission near the hydraulic shift actuator to detect a magnaflux produced by the magnet. The cylinder is so constructed as to cover the magnet even when the piston is subjected to a stroke in the cylinder.

20 Claims, 6 Drawing Sheets

FIG.3
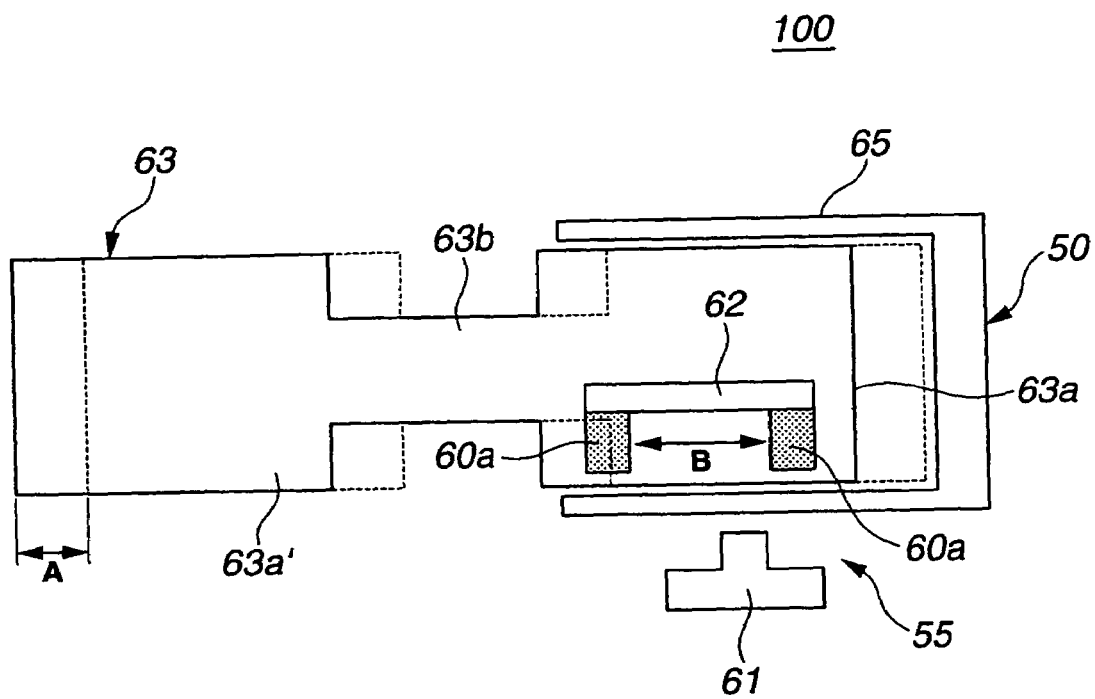
FIG.4A     FIG.4B
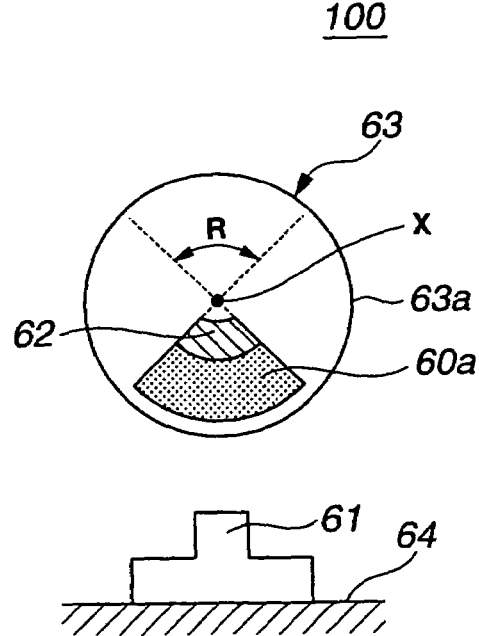     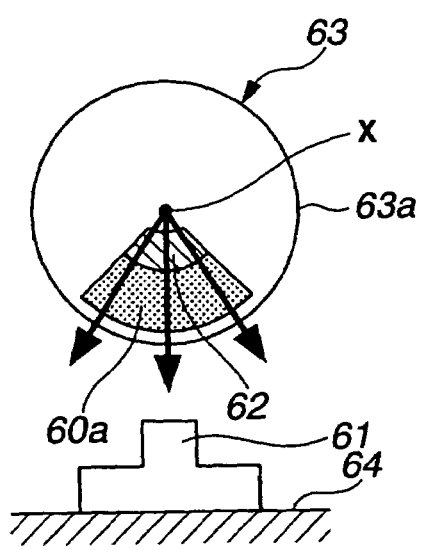

SHIFT POSITION SENSOR OF AUTOMATED MANUAL TRANSMISSION

BACKGROUND OF THE INVENTION

1. Field of the Invention

The present invention relates in general to automated manual transmissions, viz., automotive manual transmissions of an automatic speed change type that includes a plurality of shift forks, a first clutch used for establishing odd number speeds, a second clutch used for establishing even number speeds and a plurality of hydraulic shift actuators for actuating the shift forks respectively. More specifically, the present invention is concerned with a shift position sensor of such automated manual transmissions, which senses a shift position that is actually taken by the transmission.

2. Description of the Related Art

In order to clarify the task of the present invention, one known automated manual transmission will be briefly described, which is disclosed in Japanese Laid-open Patent Application (Tokkaihei) 8-320054.

The transmission disclosed in the Patent Application is of a twin clutch type that comprises a first clutch for a first group of gears that are arranged for establishing odd number speeds and a second clutch for a second group of gears that are arranged for establishing even number speeds. In such transmission, under a condition wherein one speed is selected by the gears of the first group (or second group) with the first clutch (or second clutch) kept engaged, no speed can be established by the gears of the second group (or first group). While, when, upon need of a speed change, one gear of the second group (or first group) is selected by a synchronizing meshing mechanism with the second clutch (or first clutch) kept disengaged, the first clutch (or second clutch) is disengaged and then the second clutch (or first clutch) is engaged. That is, in such transmission, a so-called automatic speed change is carried out by controlling the alternative selection of gears between the first and second groups of gears as well as the switching between first and second clutches.

In order to provide the transmission of the above-mentioned twin clutch type with such automatic speed change, there is a need of feeding a control unit of the transmission with information on the speed that is actually taken by the transmission.

In order to get such information, some of known transmissions employ a shift position sensor that comprises generally two magnets mounted on each shift fork or shift rod through a sensor bracket and a magnaflux detector mounted to an inner wall of a transmission case at a position near the two magnets. That is, when, upon a shift change operation by a driver, a corresponding shift fork or shift rod is moved together with the two magnets mounted thereon, an inevitable change of the magnaflux is sensed by the magnaflux detector, which provides the control unit with the information on change of the speed.

SUMMARY OF THE INVENTION

However, due to inherent construction, the above-mentioned shift position sensor fails to have an easiness with which the sensor can be mounted to a proper position of the transmission. Furthermore, it sometimes occurs that the sensor bracket on which the two magnets are mounted is subjected to a deformation due to a vibration constantly applied thereto under operation of an associated motor vehicle, which, of course, affects the performance of the shift position sensor. These weak points possessed by the known shift position sensor will be discussed hereinafter with the aid of FIG. 5 in the part of the detailed description of the embodiments of the present invention.

It is therefore an object of the present invention to provide a shift position sensor of an automated manual transmission, which is free of the above-mentioned drawbacks.

That is, in accordance with the present invention, there is provided a shift position sensor of an automated manual transmission, which can exhibit a high sensing ability and can be easily and strongly assembled.

In accordance with a first aspect of the present invention, there is provided a shift position sensor of an automated manual transmission. The transmission has a shift actuator that includes a cylinder and a piston that moves in the cylinder in accordance with a speed change operation of the transmission. The shift position sensor comprises a magnet mounted in the piston to move therewith and a magnaflux detector mounted to a fixed member of the transmission near the shift actuator to detect a magnaflux produced by the magnet. The cylinder is so constructed as to cover the magnet even when the piston is subjected to a stroke in the cylinder.

In accordance with a second aspect of the present invention, there is provided a shift position sensor of an automated manual transmission. The transmission has a hydraulic shift actuator that includes a cylinder, and a piston that moves in the cylinder in accordance with a speed change operation of the transmission, the piston being connected to a shift fork and moving the same to a desired position to achieve a given speed when the cylinder is fed with a pressurized fluid in response to the speed change operation. The shift position sensor comprises a magnet unit installed in the piston to move therewith; and a magnaflux detector mounted to a fixed member of the transmission at a position to face a side wall of the cylinder to detect a magnaflux produced by the magnet unit, wherein the cylinder is so constructed as to cover the magnet even when the piston is subjected to a stroke in the cylinder.

BRIEF DESCRIPTION OF THE DRAWINGS

Other objects and advantages of the present invention will become apparent from the following drawings when taken in conjunction with the accompanying drawings, in which:

FIG. 3 is a schematic view of the shift position sensor of the first embodiment, depicting a principle employed by the first embodiment;

FIGS. 4A and 4B are sectional views of the shift position sensor of the first embodiment, showing the position and shape of a magnet mounted in a piston unit;

DETAILED DESCRIPTION OF THE EMBODIMENTS

In the following, five embodiments 100, 200, 300, 400 and 500, which are shift position sensors, of the present invention will be described in detail with reference to the accompanying drawings.

For ease of understanding, various directional terms, such as, right, left, upper, lower, rightward and the like are used in the following description. However, such terms are to be understood with respect to only a drawing or drawings on which a corresponding part or portion is shown. Throughout the specification, substantially same parts and portions are denoted by the same numerals.

Figure 1:
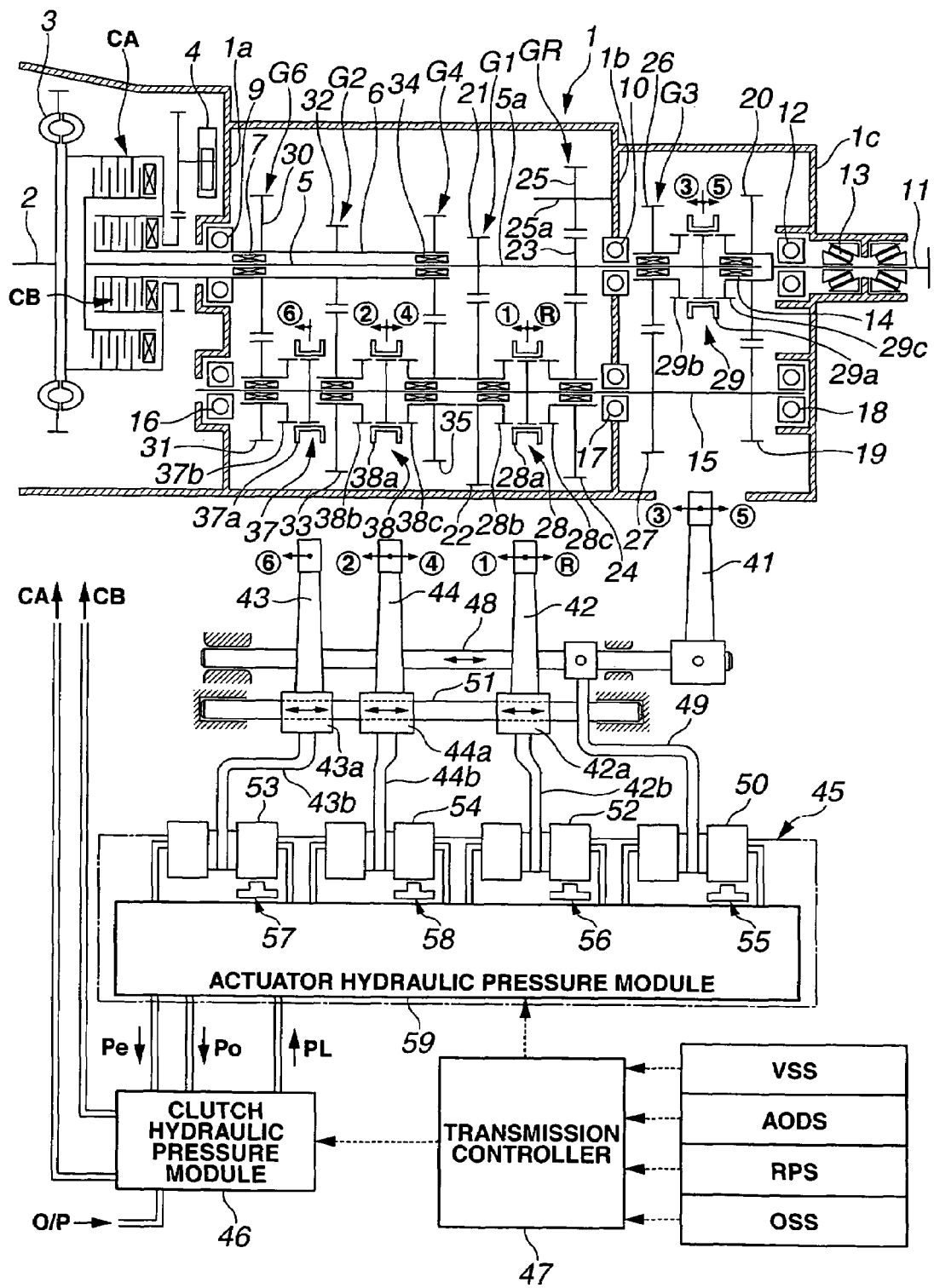
FIG. 1 is a schematic system view of a twin clutch type automated manual transmission to which a shift position sensor of a first embodiment of the invention is practically applied.

Referring to FIG. 1, there is schematically shown a twin clutch type automated manual transmission to which a shift position sensor of a first embodiment 100 of the present invention is practically applied.

The transmission shown comprises, as first stage elements, a transmission case 1, an input shaft 2 extending from an engine (not shown), a first clutch CA, a second clutch CB, a torsional damper 3, an oil pump 4, a first transmission input shaft 5 and a second transmission input shaft 6.

First clutch CA is arranged to establish odd number speeds, such as, first, third and fifth speeds and reverse, and second clutch CB is arranged to establish even number speeds, such as second, fourth and sixth speeds.

As shown, the drive side of each clutch CA or CB is connected to the engine power input shaft 2 through torsional damper 3.

The driven side of first clutch CA is connected to first transmission input shaft 5, and thus, upon engagement of first clutch CA for a selected odd number speed, a torque from the engine is transmitted to first transmission input shaft 5.

While, the driven side of second clutch CB is connected to second transmission input shaft 6, and thus, upon engagement of second clutch CB for a selected even number speed, the torque form the engine is transmitted to second transmission input shaft 6.

Oil pump 4 is driven under operation of the engine. As will be described in detail hereinafter, the pressurized oil from oil pump 4 is used for achieving ON/OFF (viz., engaged/disengaged) operation of first and second clutches CA and CB and energizing various shift actuators for selection of the speeds.

As is understood from the drawing (FIG. 1), second transmission input shaft 6 is a tubular member in and through which first transmission input shaft 5 extends. As shown, first transmission input shaft 5 is concentrically and rotatably held in the tubular second transmission input shaft 6 through front and rear needle bearings 7 and 8.

Second transmission input shaft 6 is rotatably held by a front wall 1a of transmission case 1 through a ball bearing 9.

First transmission input shaft 5 has a rearward extending part 5a that extends rearward (or rightward in the drawing) from a rear end of second transmission input shaft 6 and is rotatably held by an intermediate wall 1b of transmission case 1 through a ball bearing 10.

As shown in the drawing, a transmission output shaft 11 is coaxially arranged at a right side of first transmission input shaft 5. Output shaft 11 is rotatably held by a rear wall 1c of transmission housing 1 by means of a taper roller bearing 12 and an axial bearing 13. As shown, a front (or left) end part of output shaft 11 is rotatably held by rearward extending part 5a of first transmission input shaft 5 through a needle bearing 14. It is thus to be noted that first and second transmission input shafts 5 and 6 and transmission output shaft 11 are arranged coaxially, that is, arranged on an imaginary common axis.

Beside the coaxially arranged three shafts 5, 6 and 11, there is arranged a countershaft 15 that is rotatably held by front, intermediate and rear walls 1a, 1b and 1c of transmission case 1 through respective roller bearings 16, 17 and 18, as shown.

To a rear (or right) end of countershaft 15, there is integrally connected a counter gear 19. This gear 19 is meshed with an output gear 20 integrally mounted on transmission output shaft 11, so that countershaft 15 and transmission output shaft 11 rotate together. It is to be noted that counter gear 19 and output gear 20 constitute a speed reduction gear unit. More specifically, the diameter of counter gear 19 is smaller than that of output gear 20, as shown.

Between rearward extending part 5a of first transmission input shaft 5 and countershaft 15, there are arranged a first speed gear unit G1, a reverse gear unit GR and a third speed gear unit G3 respectively. As shown, these three units G1, GR and G3 are arranged in a direction from the front side to the rear side of the transmission.

First speed gear unit G1 comprises a first speed input gear 21 that is provided on the rearward extending part 5a of the input shaft 5 and a first speed output gear 22 that is rotatably provided on countershaft 15 and meshed with first speed input gear 21.

Reverse gear unit GR comprises a reverse input gear 23 that is provided on the rearward extending part 5a of the input shaft 5, a reverse output gear 24 that is rotatably provided on countershaft 15 and a reverse idler gear 25 that is operatively meshed with the input and output gears 23 and 24, more specifically, operatively interposed between the input and output gears 23 and 24. As shown, reverse idler gear 25 is rotatably held by a reverse idler shaft 25a that extends forward from the intermediate wall 1b of transmission case 1.

Third speed gear unit G3 comprises a third speed input gear 26 that is provided on the rearward extending part 5a of the input shaft 5 and a third speed output gear 27 that is rotatably provided on countershaft 15 and meshed with third speed input gear 26.

Around countershaft 15 at a position between first speed gear unit G1 and reverse gear unit GR, there is arranged a 1-R synchronizing mechanism 28 that includes an axially movable coupling sleeve 28a and two clutch gears 28b and 28c.

When coupling sleeve 28a is moved leftward from the illustrated neutral position and engaged with clutch gear 28b in a spline coupling manner, first speed output gear 22 becomes tightly coupled with countershaft 15 thereby to operatively connect input shaft 5 with countershaft 15 through first speed input and output gears 21 and 22. Upon this, first speed is ready for selection.

While, when coupling sleeve 28a is moved rightward from the illustrated neutral position and engaged with the other clutch gear 28c in a spline coupling manner, reverse output gear 24 becomes tightly coupled with countershaft 15. Upon this, reverse mode is ready for selection.

Around rearward extending part 5a of first transmission input shaft 5 at a position between third speed gear unit G3 and the above-mentioned output gear 20, there is arranged a 3-5 synchronizing mechanism 29 that includes an axially movable coupling sleeve 29a and two clutches 29b and 29c.

When coupling sleeve 29a is moved leftward from the illustrated neutral position and engaged with clutch gear 29b in a spline coupling manner, third speed input gear 26 becomes tightly coupled with first transmission input shaft 5. Upon this, third speed is ready for selection.

While, when coupling sleeve 29a is moved rightward from the illustrated neutral position and engaged with clutch gear 29c in a spline coupling manner, output gear 20 becomes tightly coupled with first transmission input shaft 5. Upon this, fifth speed is ready for selection.

Between second transmission input shaft 6 and countershaft 15, there are arranged a sixth speed gear unit G6, a second speed gear unit G2 and a fourth speed gear unit G4 respectively. As shown, these three units G6, G2 and G4 are arranged in a direction from the front side to the rear side of the transmission.

Sixth speed gear unit G6 comprises a sixth speed input gear 30 that is provided on second transmission input shaft 6 and a sixth speed output gear 31 that is rotatably provided on countershaft 15 and meshed with sixth speed input gear 30.

Second speed gear unit G2 comprises a second speed input gear 32 that is provided on second transmission input shaft 6 and a second speed output gear 33 that is rotatably provided on countershaft 15 and meshed with second speed input gear 32.

Fourth speed gear unit G4 comprises a fourth speed input gear 34 that is provided on second transmission input shaft 6 and a fourth speed output gear 35 that is rotatably provided on countershaft 15 and meshed with fourth speed input gear 34.

Around countershaft 15 at a position beside sixth speed gear unit G6, there is arranged a 6-N synchronizing mechanism 37 that includes an axially movable coupling sleeve 37a and one clutch gear 37b.

When coupling sleeve 37a is moved leftward from the illustrated neutral position and engaged with clutch gear 37b in a spline coupling manner, sixth speed output gear 31 becomes tightly coupled with countershaft 15. Upon this, sixth speed is ready for selection.

Around countershaft 15 at a position between second speed gear unit G2 and fourth speed gear unit G4, there is arranged 2-4 synchronizing mechanism 38 that comprises a coupling sleeve 38a and two clutch gears 38b and 38c.

When coupling sleeve 38a is moved leftward from the illustrated neutral position and engaged with clutch gear 38b in a spline coupling manner, second speed output gear 33 becomes tightly coupled with countershaft 15. Upon this, second speed is ready for selection.

While, when coupling sleeve 38a is moved rightward from the illustrated neutral position and engaged with the other clutch gear 38c in a spline coupling manner, fourth speed output gear 35 becomes tightly engaged with countershaft 15. Upon this, fourth speed is ready for selection.

As shown in FIG. 1, for controlling ON/OFF operation of first and second clutches CA and CB and selection of the various speeds, there is provided a control system that generally includes a 3-5 shift fork 41, a 1-R shift fork 42, a 6-N shift fork 43, a 2-4 shift fork 44, an actuator unit 45, a clutch hydraulic pressure module 46 and a transmission controller 47.

3-5 shift fork 41 is operatively engaged with coupling sleeve 29a of 3-5 synchronizing mechanism 29 and is secured to a first shift rod 48. This first shift rod 48 is axially movably held by front and intermediate walls 1a and 1b of transmission case 1. To first shift rod 48, there is fixed a 3-5 shift bracket 49. A leading end of this 3-5 shift bracket 49 is operatively connected to a piston unit of a 3-5 shift actuator 50. Thus, upon energization of this actuator 50, 3-5 shift fork 41 is moved in accordance with movement of the piston unit of the actuator 50, that is, moved leftward from the illustrated neutral position upon selection of third speed or rightward from the illustrated neutral position upon selection of fifth speed.

1-R shift fork 42 is operatively engaged with coupling sleeve 28a of 1-R synchronizing mechanism 28 and axially movably disposed on a second shift rod 51 through a tubular base portion 42a thereof. This second shift rod 51 is tightly held by front and intermediate walls 1a and 1b of transmission case 1. Tubular base portion 42a is integrally formed with a bracket arm 42b that has a leading end operatively connected to a piston unit of a 1-R shift actuator 52. Thus, upon energization of this actuator 52, 1-R shift fork 42 is moved in accordance with movement of the piston unit of the actuator 52, that is, moved leftward from the illustrated neutral position upon selection of first speed or moved rightward from the illustrated neutral position upon selection of Reverse.

6-N shift fork 43 is operatively engaged with coupling sleeve 37a of 6-N synchronizing mechanism 37 and axially movably disposed on the fixed shift rod 51 through a tubular base portion 43a thereof. Tubular base portion 43a is integrally formed with a bracket arm 43b that has a leading end operatively connected to a piston unit of a 6-N shift actuator 53. Thus, upon energization of this actuator 53, 6-N shift fork 43 is moved in accordance with movement of the piston unit of the actuator 53, that is, moved leftward from the illustrated neutral position upon selection of sixth speed.

2-4 shift fork 44 is operatively engaged with coupling sleeve 38a of 2-4 synchronizing mechanism 38 and axially movably disposed on the fixed shift rod 51 through a tubular base portion 44a thereof. Tubular base portion 44a is integrally formed with a bracket art 44b that has a leading end operatively connected to a piston unit of a 2-4 shift actuator 54. Thus, upon energization of this actuator 54, 2-4 shift fork 44 is moved in accordance with movement of the piston unit of the actuator 54, that is, moved leftward from the illustrated neutral position upon selection of second speed or moved rightward from the illustrated neutral position upon selection of fourth speed.

The above-mentioned actuator unit 45 is mounted to a given portion of transmission housing 1 and includes the above-mentioned 3-5 shift actuator 50, 1-R shift actuator 52, 6-N shift actuator 53 and 2-4 shift actuator 54.

The actuator unit 45 further includes a 3-5 shift position sensor 55, a 1-R shift position sensor 56, a 6-N shift position sensor 57, a 2-4 shift position sensor 58 and an actuator hydraulic pressure module 59.

It is now to be noted that the shift position sensors 55, 56, 57 and 58 are those of the present invention.

The actuator hydraulic pressure module 59 produces a pressure "Po" for the odd number speeds and a pressure "Pe" for the even number speeds by practically using a line pressure "PL" as a source, that is regulated by the above-mentioned clutch hydraulic pressure module 46. Furthermore, in accordance with the speed selected, the actuator hydraulic pressure module 59 feeds the shift actuator 50, 52, 53 or 54 with a corresponding operation pressure through a corresponding hydraulic passage.

The clutch hydraulic pressure module 46 regulates the line pressure "PL" based on the amount of the discharge from oil pump 4, and produces respective control pressures for first and second clutches CA and CB in accordance with the pressures "Pe" and "Po" respectively produced by actuator hydraulic pressure module 59.

By processing information signals from a vehicle speed sensor "VSS", an accelerator open degree sensor (or accelerator pedal depressed degree sensor) "AODS", a range position sensor "RPS" and other sensors and switches "OSS", the above-mentioned transmission controller 47 issues instruction signals to actuator hydraulic pressure module 59 to control the selection of the speeds and issues instruction signals to clutch hydraulic pressure module 46 to control the ON/OFF operation of each clutch "CA" or "CB". The controller 47 further issues an instruction signal for controlling the line pressure "PL".

As will become apparent as the description proceeds, the shift position sensor of the present invention comprises generally two magnets mounted on a member that moves upon speed change operation, a magnaflux detector mounted on a fixed member that is positioned near the two magnets and a yoke that connects the two magnets and is positioned at an opposite side of the magnaflux detector with respect to the magnets.

Figure 2:
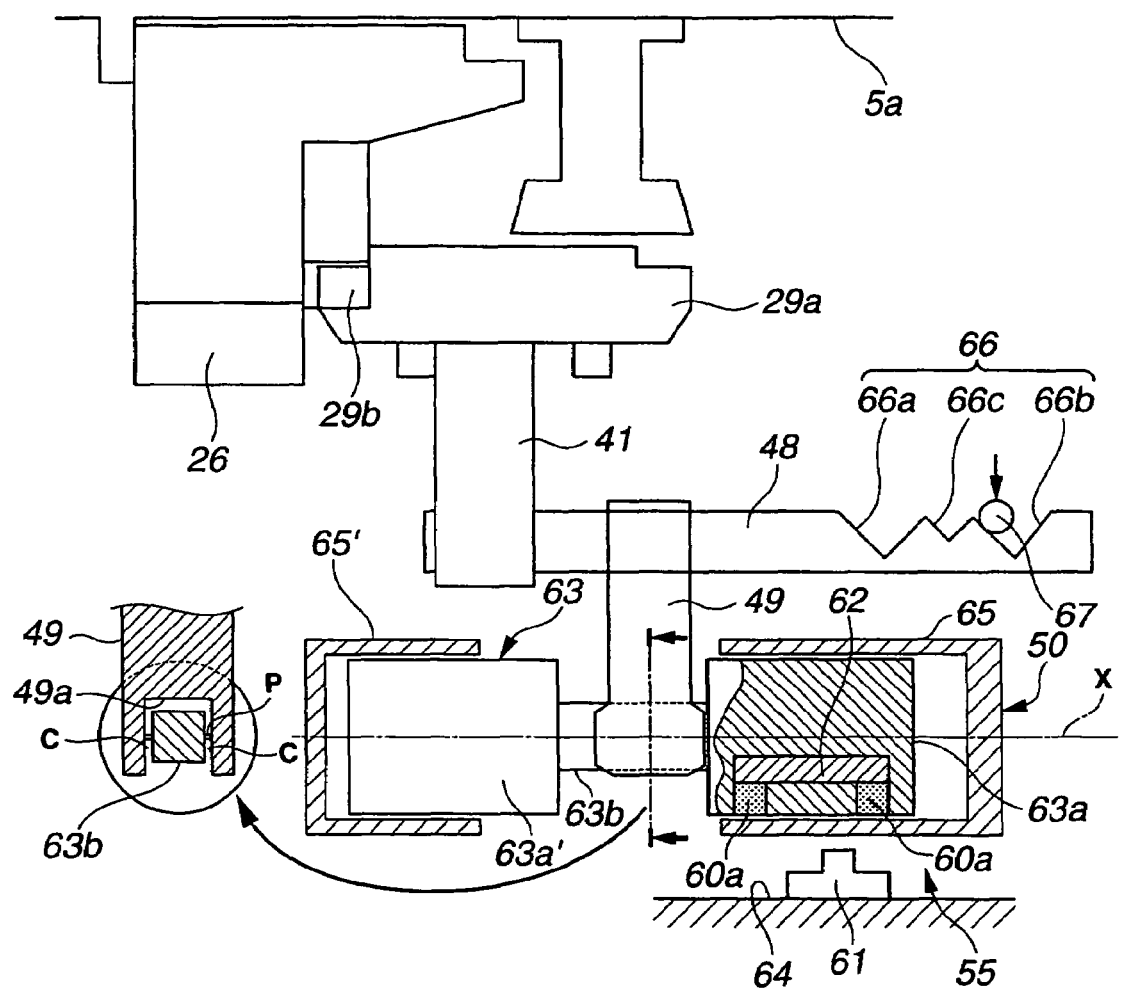
FIG. 2 is a schematic view of the shift position sensor of the first embodiment.

Referring to FIGS. 2 to 4, there is shown the detail of the above-mentioned 3-5 shift position sensor 55, which is the shift position sensor of a first embodiment 100 of the present invention.

As is seen from FIG. 2, 3-5 shift position sensor 55 comprises two magnets 60a and 60a that are embedded in one (or right) piston portion 63a of the piston unit 63 of 3-5 shift actuator 50, an axially extending yoke 62 that extends between the two magnets 60a and 60a and a magnaflux detector 61 that is mounted on an actuator unit case 64 at a position near the two magnets 60a and 60a. As shown, yoke 62 is placed at a position opposite to magnaflux detector 61 with respect to the magnets 60a and 60a.

As is seen, one (that is, the cylinder 65) of the mutually facing two cylinders 65 and 65', which slidably receives the piston portion 63a in which the magnets 60a and 60a are embedded, is so sized and constructed as to sufficiently cover both the magnets 60a and 60a even when piston unit 63 is moved to an extreme position, viz., the leftmost position, relative to cylinders 65 and 65'.

More specifically, the cylinder 65 is so constructed as to conceal the magnets 60a and 60a from magnaflux detector 61 even when piston portion 63a is moved to its predetermined up-position in cylinder 65.

As shown and mentioned hereinabove, piston unit 63 comprises the paired piston portions 63a and 63a' and a stem portion 63b that extends between the paired piston portions 63a and 63a'. In the illustrated embodiment, stem portion 63b has a square cross section.

As shown in FIG. 2, stem portion 63b is spacedly received in a rectangular cut 49a provided in a lower end of 3-5 shift bracket 49. Preferably, stem portion 63b is positioned in just the middle part of rectangular cut 49a leaving a certain and equal clearance "C" between each side of stem portion 63b and a corresponding inner wall of the cut 49a, as shown. A pivot pin "P" piercing stem portion 63b extends from one inner wall of the cut 49a to the other wall of the same, so that the axial movement of stem portion 63b is directly transmitted to 3-5 shift bracket 49 while permitting a slight pivoting of the stem portion 63b about an axis "X" of the same.

Preferably, the permitted slight pivoting of the stem portion 63b about the axis "X" is about ±12 degrees in angle from a neutral position, that is, about 24 degrees in total.

As is described hereinabove, the automated manual transmission to which the shift position sensor of the invention is practically applied is of a twin clutch type that has first clutch CA that is engaged when one of odd number speeds (viz., first, third, fifth speeds and reverse) is selected, and second clutch CB that is engaged when one of even number speeds (viz., second, fourth and sixth speeds) is selected.

It is now to be noted that substantially same sensors 56, 57 and 58 as the above-mentioned 3-5 shift position sensor 55 are applied to 1-R shift actuator 52, 6-N shift actuator 53 and 2-4 shift actuator 54.

For simplification of description, the detailed explanation on the shift position sensor of the present invention will be directed to only the 3-5 shift position sensor 55. More specifically, 1-R shift position sensor 56, 6-N shift position sensor 57 and 2-4 shift position sensor 58 have substantially the same construction as the 3-5 shift position sensor 55.

As is seen from FIG. 3, in order to allow 3-5 shift position sensor 55 (or shift position sensor) to have a satisfied detactability in a stroke direction of piston unit 63, the following dimensional or positional relationship is established in the construction of the sensor 55.

$$B > A \quad (1)$$

wherein:

B: distance between two magnets 60a and 60a
A: stroke of piston unit 63

As is seen from FIG. 4A, each magnet 60a embedded in right piston portion 63a of piston unit 63 has a sector (or fan-shaped) cross section and is concentrically put in piston portion 63a with respect to the axis "X" of piston unit 63.

It is to be noted that a radian "R" defined by the circumferentially opposed sides of the sector cross section of magnet 60a is sufficiently larger than the above-mentioned pivot angle that is permitted by the stem portion 63b (or piston unit 63).

Thus, if the permitted pivot angle of piston unit 63 is about 24 degrees as is mentioned hereinabove, the radian "R" defined by the circumferentially opposed sides of the sector cross section of magnet 60a should be larger than 24 degrees. Preferably, the radian "R" is about 60 degrees.

As is seen from FIG. 4B, the circumferentially opposed sides of the sector cross section of each magnet 60a are in agreement with a radial direction of piston unit 63. Of course, as is seen from FIG. 3, each magnet 60a has an even thickness throughout the entire structure thereof and is evenly magnetized in a radial direction.

As is seen from FIG. 4A, axially extending yoke 62 has also a sector cross section and has a rounded outer surface on which the concave upper surfaces of two magnets 60a and 60a are intimately received.

It is to be noted that piston unit 63 is constructed of a non-magnetic metal, such as duralumin or the like. For permitting magnets 60a and 60a to have a high heat resistance, samarium cobalt may be used as a base material. Yoke 62 is constructed of a magnetic metal such as iron or the like.

Referring back to FIG. 2, first shift rod 48 is incorporated with a check mechanism. The check mechanism comprises three notches 66 formed on first shift rod 48, which are a notch 66a for the third speed, a notch 66b for the fifth speed and a neutral shallow notch 66c for a neutral position that is positioned between the two notches 66a and 66b. A spring biased ball 67 is pressed against the notches.

In order to move first shift rod 48 to a position corresponding to the third speed, the fifth speed or the neutral position of the transmission, a given amount of pressurized fluid is fed to one of two work chambers of cylinders 65 and 65'. Upon completion of establishment of a selected speed, the fluid is drained from the selected work chamber. Thus, under such condition, the force for keeping the first shift rod 48 at the selected position is produced by the spring biased ball 67.

In the following, operation will be described with the aid of the drawings.

First, speed change operation will be described with reference to FIG. 1.

When the transmission is in a neutral condition (N-range) or a park condition (P-range), both first and second clutches CA and CB are released or disengaged and all of the shift actuators 50, 52, 53 and 54 are in their neutral conditions as shown in the drawing. That is, in this neutral condition, all of coupling sleeves 28a, 29a, 37a and 38a are in their neutral positions and thus no power transmission is carried out in the transmission.

When now drive-range (D-range), reverse-range (R-range) or a manual mode is selected, a speed change is carried out basically in the following manner.

That is, when first speed is selected, 1-R shift actuator 52 is energized to move 1-R shift fork 42 leftward in FIG. 1. With this, due to the above-mentioned reasons, first speed output gear 22 is tightly coupled with countershaft 15 thereby establishing an operative connection between input shaft 5 and countershaft 15 through first speed input and output gears 21 and 22. Then, first clutch CA is brought into its engaged condition. With this, the power or torque from first clutch CA is transmitted through first transmission input shaft 5, first speed gear unit G1, countershaft 15 and an output gear unit of gears 19 and 20 to transmission output shaft 11. That is, a power transmission for the first speed is actually carried out.

Upon need of up-shifting from the first speed to the second speed, 2-4 shift actuator 54 is energized to move 2-4 shift fork 44 leftward in FIG. 1. With this, second speed output gear 33 is tightly coupled with countershaft 15. Then, first clutch CA is released or disengaged and second clutch CB is engaged. With this, the up-shifting from first speed to the second speed is completed. Thus, the power from second clutch CB is transmitted through second transmission input shaft 6, second speed gear unit G2, countershaft 15 and the output gear unit of gears 19 and 20 to transmission output shaft 11. That is, a power transmission for the second speed is actually carried out.

Upon need of up-shifting from the second speed to the third speed, 3-5 shift actuator 50 is energized to move 3-5 shift fork 41 leftward in FIG. 1. With this, third speed input gear 26 is tightly coupled with first transmission input shaft 5. Then, second clutch CB is released and first clutch CA is engaged. With this, the up-shifting from the second speed to the third speed is completed. Thus, the power from the first clutch CA is transmitted through first transmission input shaft 5, third speed gear unit G3, countershaft 15 and the output gear unit of gears 19 and 20 to transmission output shaft 11. That is, a power transmission for the third speed is actually carried out.

Upon need of up-shifting from the third speed to the fourth speed, 2-4 shift actuator 54 is energized to move 2-4 shift fork 44 rightward in FIG. 1. With this, fourth speed output gear 35 is tightly coupled with countershaft 15. Then, first clutch CA is released and second clutch CB is engaged. With this, the up-shifting from the third speed to the fourth speed is completed. Thus, the power from the second clutch CB is transmitted through second transmission input shaft 6, fourth speed gear unit G4, countershaft 15 and the output gear unit of gears 19 and 20 to transmission output shaft 11. That is, a power transmission for the fourth speed is actually carried out.

Upon need of up-shifting from the fourth speed to the fifth speed, 3-5 shift actuator 50 is energized to move 3-5 shift fork 41 rightward in FIG. 1. With this, first transmission input shaft 5 is tightly coupled with transmission output shaft 11 directly. Then, second clutch CB is released and first clutch CA is engaged. With this, the up-shifting from the fourth speed to the fifth speed is completed. Thus, the power from first clutch CA is transmitted through first transmission input shaft 5 to transmission output shaft 11. That is, a power transmission for the fifth speed (viz., speed change ratio=1) is carried out.

Upon need of up-shifting from the fifth speed to the sixth speed, 6-N shift actuator 53 is energized to move 6-N shift fork 43 leftward in FIG. 1. With this, sixth speed output gear 31 is tightly coupled with countershaft 15. Then, first clutch CA is released and second clutch CB is engaged. With this, the up-shifting from the fifth speed to the sixth speed is completed. Thus, the power from second clutch CB is transmitted through second transmission input shaft 6, sixth speed gear unit G6, countershaft and the output gear unit of gears 19 and 20 to transmission output shaft 11. That is, a power transmission for the sixth speed is carried out.

Upon need of down-shifting from the sixth speed to the fifth speed, from the fifth speed to the fourth speed, from the fourth speed to the third speed, from the third speed to the second speed or from the second speed to the first speed, similar operation except for the moving direction of shift forks 41, 42, 43 and 44 and the ON/OFF turning of first and second clutches CA and CB is carried out.

When R-range is selected, 1-R shift actuator 52 is energized to move 1-R shift fork 42 rightward in FIG. 1. With this, reverse output gear 24 is tightly coupled with countershaft 15. Then, first clutch CA is engaged. With this, R-range is completed. Thus, the power from first clutch CA is transmitted through first transmission input shaft 5, reverse gear unit GR, countershaft 15 and the output gear unit of gears 19 and 20 to transmission output shaft 11. That is, a power transmission for the reverse is carried out. Due to usage of three gears 23, 25 and 24 by reverse gear unit GR, the turning direction of transmission output shaft 11 is reversed.

As is described hereinabove, in the twin clutch type automated manual transmission, the automatic speed change is carried out by making alternate selection of gear units between one group for the odd speeds and the other group for the even speeds and changing alternately ON/OFF condition of the two clutches CA and CB.

As has been mentioned hereinabove, in order to control the twin clutch type automated manual transmission in the above-mentioned manner, it is necessary to feed transmission controller 47 (see FIG. 1) with information on a shift or speed position that has been just established by the transmission.

Figure 5:
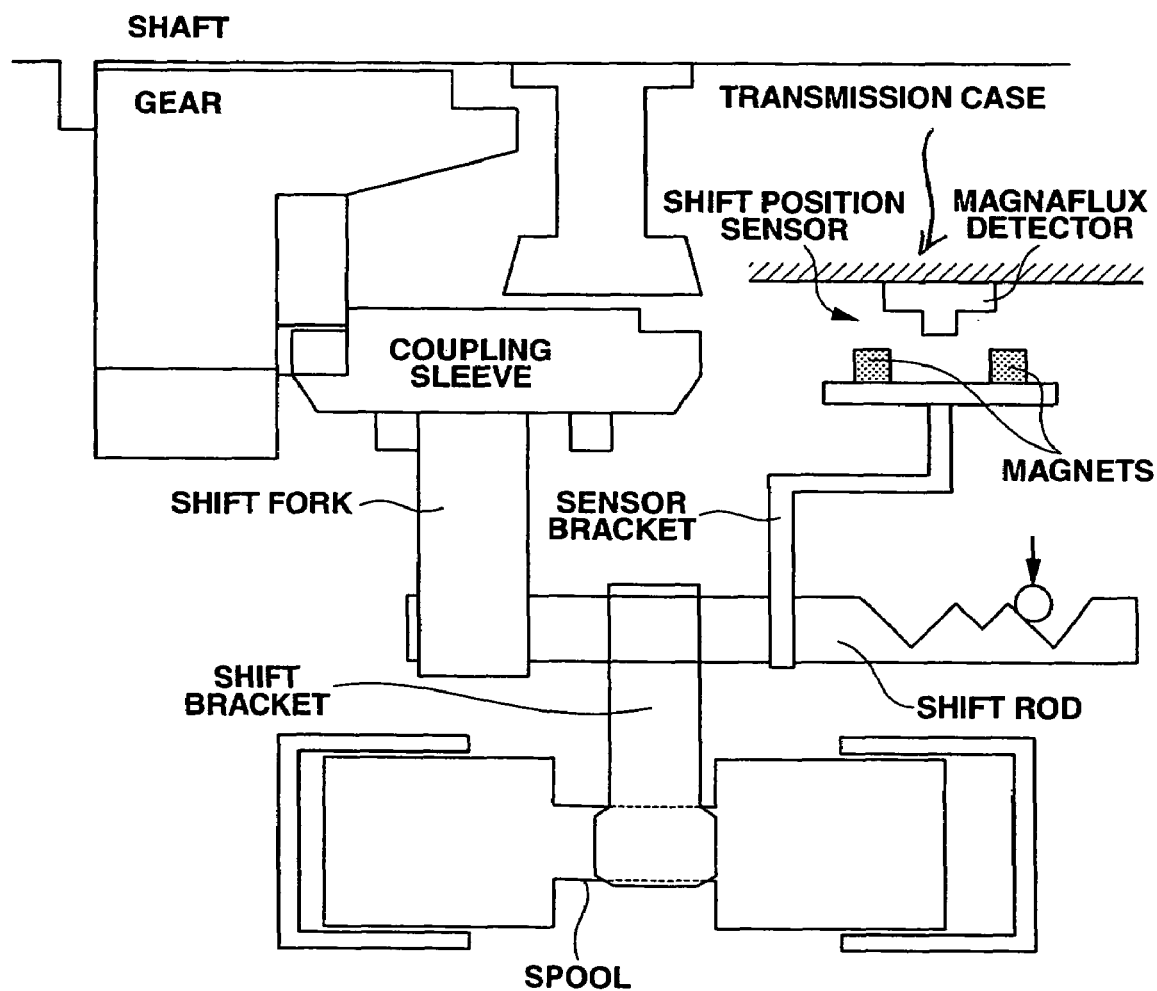
FIG. 5 is a schematic system view of a known shift position sensor.

For this purpose, various shift position sensors have been hitherto proposed. One of such known shift position sensors is shown in FIG. 5.

For clarifying features of the shift position sensor of the present invention, the known shift position sensor will be briefly described in the following with the aid of FIG. 5.

As is seen from the drawing, in the known sensor, a sensor bracket is secured to the shift rod, and two magnets are mounted on the sensor bracket. A magnaflux detector is mounted on an inner wall of a transmission case at a position to face the two magnets. That is, when, upon a shift change operation, the shift fork is moved together with two magnets mounted thereto, the magnaflux detector detects a change of the magnaflux produced by the two magnets, which provides the transmission controller 47 with information on the shift position that the transmission has just established.

However, due to its inherent construction, the above-mentioned known shift position sensor has the following weak points.

First, it is quite difficult to precisely arrange the sensor in a limited space that is defined between the inner wall of the transmission case and the shift rod.

Second, because the sensor bracket is of a so-called overhung type, the forward and backward movement of the shift rod tends to produce vibration of the sensor bracket and thus that of the magnets, which lowers the performance of the sensor. Furthermore, due to the same reasons, sensor bracket tends to have a fatigue deformation.

Third, it is difficult to make a precise positioning of the parts because of the flexibility of sensor bracket.

Fourth, because the magnets are nakedly exposed to the interior of the transmission case, they have a high possibility to be contaminated by the transmission oil. Of course, in such case, the detecting performance of the shift position sensor is lowered.

While, in shift position sensor 100 of the first embodiment of the invention, the two magnets 60*a* and 60*a* are embedded in one piston portion 63*a* of piston unit 63 and magnaflux detector 61 is mounted on actuator unit case 64. Furthermore, one cylinder 65 that slidably receives the piston portion 63*a* is so sized and constructed as to sufficiently cover both the magnets 60*a* and 60*a* even when piston unit 63 takes a maximum drawn position.

It is to be noted that the sensor 100 having the above-mentioned construction is free of the weak points that the known sensor possesses.

That is, in the sensor 100, there is no need of using the overhung type sensor bracket that is a so-called unstable element. Furthermore, in the sensor 100, the essential elements, viz., two magnets 60*a* and 60*a* and magnaflux detector 61 are mounted on parts that constitute a shift actuator device. Furthermore, one cylinder 65 that slidably receives the magnet-embedded piston portion 63*a* is so sized and constructed as to sufficiently cover both the magnets 60*a* and 60*a* even when the piston portion 63*a* takes such a maximum drawn position.

Because of the above-mentioned constructional features, the following advantages are provided by the shift position sensor 100 of the first embodiment of the present invention.

First, since magnets 60*a* and 60*a* are fully embedded in piston portion 63*a* of piston unit 63, the stability and durability of the same are improved.

Second, since piston unit 63 that has the two magnets 60*a* and 60*a* embedded therein and actuator unit case 64 that has magnaflux detector 61 mounted thereon are mutually adjacent members that are installed in actuator unit 45, the work for making a mutual positioning between two magnets 60*a* and 60*a* and magnaflux detector 61 is easily carried out. The work is much facilitated when actuator unit case 64 and cylinders 65 and 65' are integrally formed. When actuator unit case 64 and cylinders 65 and 65' are integrally formed, an accurate positioning between magnets 60*a* and 60*a* and magnaflux detector 61 is easily achieved by only placing or mounting magnaflux detector 61 to its proper position. This brings about provision of an exact clearance that is defined between the two magnets 60*a* and 60*a* and the magnaflux detector 61.

Third, since both the two magnets 60*a* and 60*a* are covered or concealed by cylinder 65 irrespective of the position that piston unit 63 takes, the magnets 60*a* and 60*a* are protected from being contaminated by the transmission oil.

Fourth, since the connection between piston unit 63 and shift bracket 49 is so made as to permit a slight pivoting of piston unit 63 about its axis, the axial movement of piston unit 63 is smoothly carried out even if the mutual positioning between piston unit 63 and shift bracket 49 is not precisely made.

Fifth, satisfied detectability of shift position sensor 55 is assured since the distance "B" between two magnets 60*a* and 60*a* is determined larger than the stoke "A" of piston unit 63. That is, in this case, the magnaflux amount that magnaflux detector 61 detects upon stroke of piston unit 63 varies linearly. As is known, the method for detecting the linearly varying change is not difficult, which facilitates the detection of position of piston unit 63, that is, the detection of the shift position.

Sixth, since each of magnets 60*a* and 60*a* has a sector cross section and is concentrically embedded in piston portion 63*a*, the pivoting of piston unit 63 about its axis X that may occur during the axial movement thereof makes substantially no effect on the magnaflux produced by the two magnets 60*a* and 60*a*. This means an assured and precise detectability by shift position sensor 100.

Figure 6:
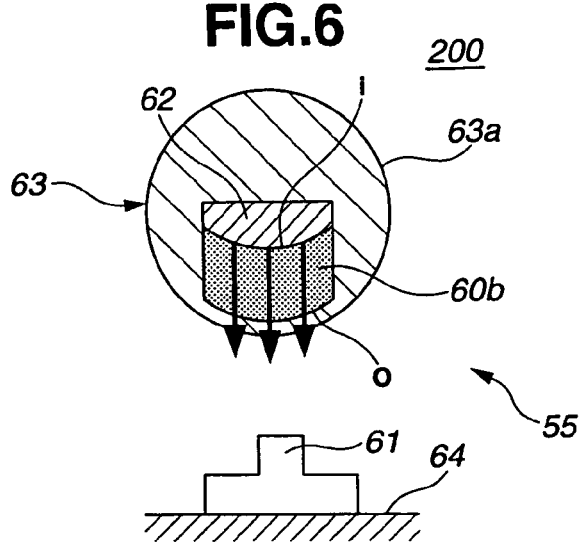
FIG. 6 is a view similar to FIG. 4A, but showing an essential part of a shift position sensor of a second embodiment of the present invention.

Referring to FIG. 6, there is shown a sectional view similar to FIG. 4B, but which shows an essential portion of a shift position sensor 200 of a second embodiment of the present invention.

As is seen from this drawing, in this embodiment 200, each magnet 60*b* has an arc-shaped cross section and an even thickness throughout the entire structure thereof, and is evenly magnetized in substantially straight direction.

In this second embodiment 200, the length of inside concave part "i" and that of outside convex part "o" are substantially the same.

In this second embodiment 200, in addition to the advantages possessed by the above-mentioned first embodiment 100, the following advantage is further obtained.

That is, it is easy to produce magnets 60*b* because of the magnetization in the straight direction. Actually, for the production of magnets 60*b*, at first, a large block of material is magnetized and then the magnetized block is cut into a plurality of pieces, viz., the magnets 60*b*. As is easily understood, such production method brings about a low cost product of the shift position sensor 200.

Figure 7:
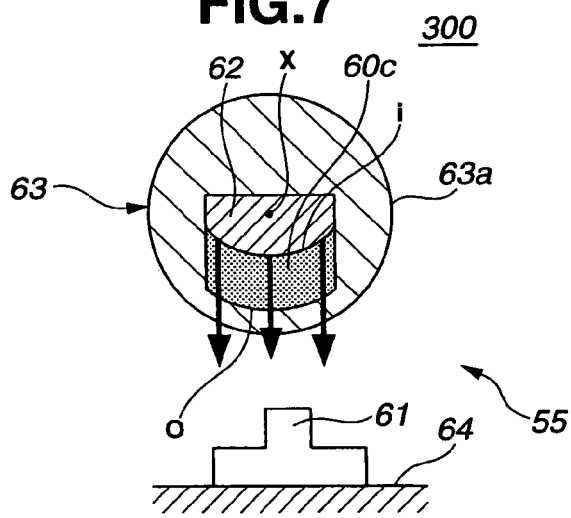
FIG. 7 is a view similar to FIG. 4A, but showing an essential part of a shift position sensor of a third embodiment of the present invention.

Referring to FIG. 7, there is shown a sectional view similar to FIG. 6, but which shows an essential portion of a shift position sensor 300 of a third embodiment of the present invention.

As is seen from this drawing, in this third embodiment 300, each magnet 60*c* has also an arc-shaped cross section like the above-mentioned second embodiment 200.

However in this embodiment 300, the curvature of outer convex part "o" is smaller than that of inside concave part "i". This means that the thickness of each magnet 60*c* gradually increases as the position shifts from the middle portion toward a laterally outer side.

In this third embodiment 300, substantially same advantages as those possessed by the above-mentioned second embodiment 200 are obtained. In addition, as is seen from the drawing, because of the changing in thickness of the magnet 60*c*, the magnetic force produced at the laterally outer sides of the magnet 60*c* is higher than that produced at the middle portion. This allows magnaflux detector 61 to detect a substantially equal magnetic force even if piston unit 63 pivots about the axis "x" by a certain angular range. This means improvement in sensing ability of the shift position sensor 300.

Figure 8:
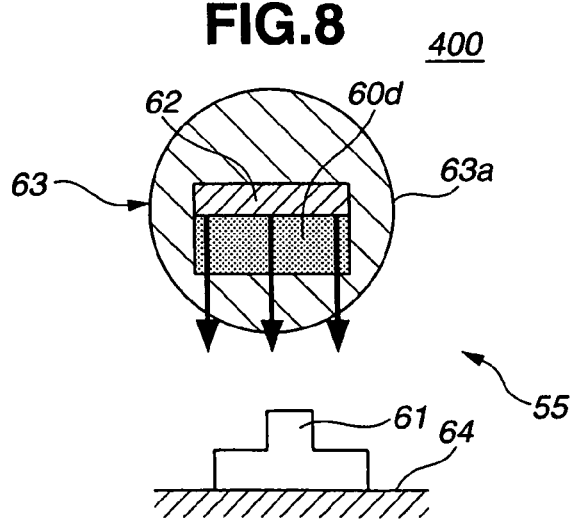
FIG. 8 is a view also similar to FIG. 4A, but showing an essential part of a shift position sensor of a fourth embodiment of the present invention.

Referring to FIG. 8, there is shown a sectional view similar to FIG. 6, but which shows an essential portion of a shift position sensor 400 of a fourth embodiment of the present invention.

As is seen from the drawing, in this fourth embodiment 400, each magnet 60*d* has a rectangular cross section and has an even thickness throughout the entire construction thereof, and is evenly magnetized in substantially straight direction.

In this fourth embodiment 400, when, as shown in the drawing, piston unit 63 takes a neutral position, the distance between magnet 60*d* and magnaflux detector 61 is relatively long. However, the distance gradually reduces as piston unit 63 pivots about the axis "X". This means that the slight pivoting of piston unit 63 makes substantially no effect on the amount of magnetic force (or the amount of magnetic flux) that magnaflux detector 61 detects.

Figure 9:
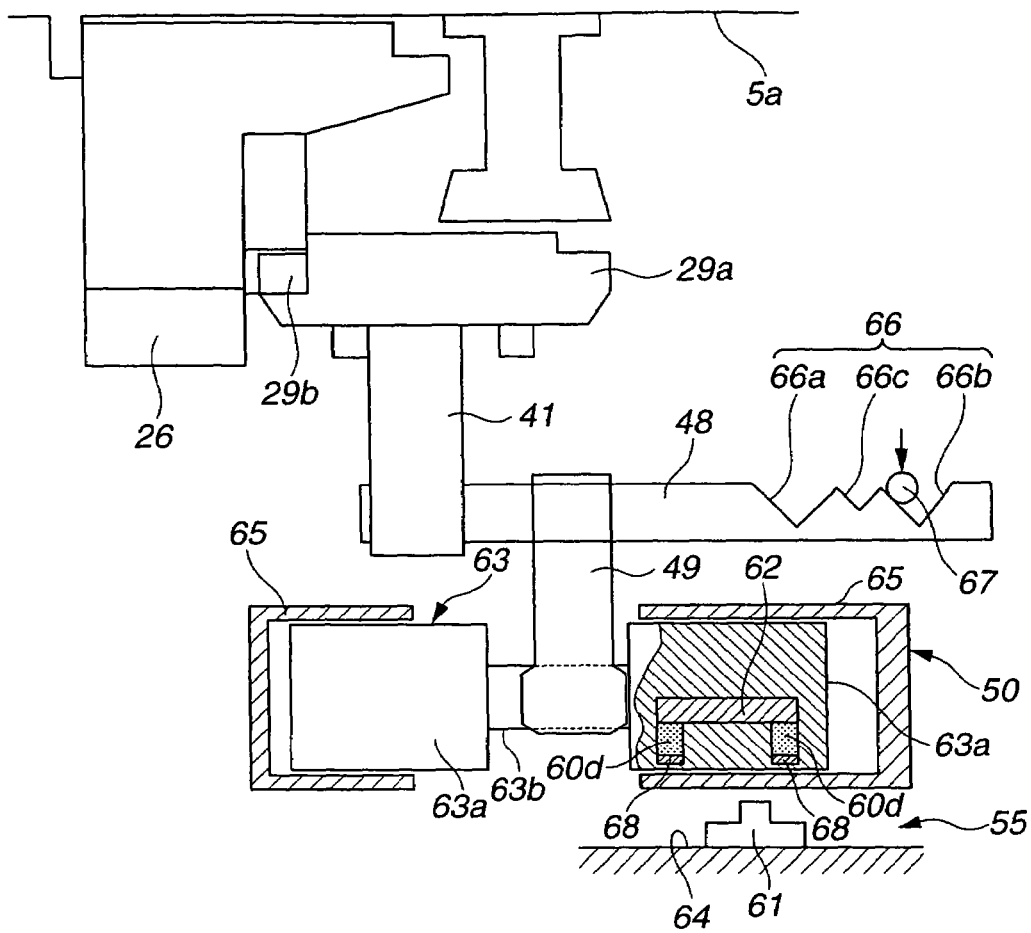
FIG. 9 is a schematic system view of a shift position sensor of a fifth embodiment of the present invention.
Figure 10:
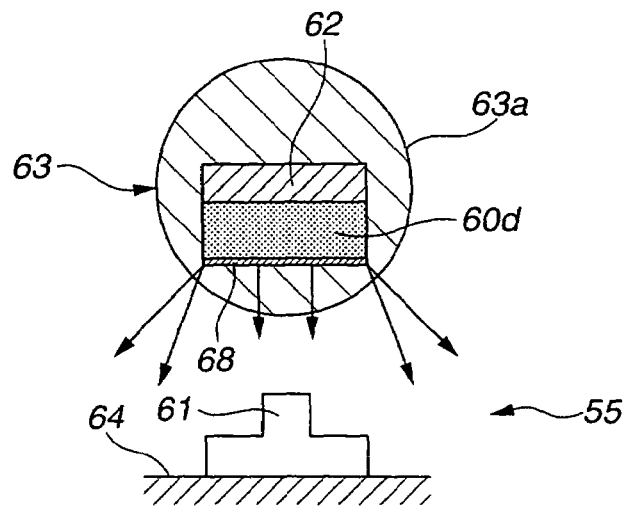
FIG. 10 is a view similar to FIG. 4A, but showing an essential part of the shift position sensor of the fifth embodiment of FIG. 9.

Referring to FIGS. 9 and 10, there is shown a shift position sensor 500 which is a fifth embodiment of the present invention.

As is seen from these drawings, in this fifth embodiment 500, each magnet 60d is the same as the above-mentioned magnet 60d of the fourth embodiment 400 (see FIG. 8).

However, in this fifth embodiment 500, each magnet 60d is provided at a leading part thereof with a rectifying iron plate 68.

As is seen from FIG. 10, due to provision of rectifying iron plate 68, the magnetic force produced by magnet 60d shows a higher degree at lateral parts thereof than at a middle part thereof. It has been revealed that when the rectifying iron plate 68 has a thickness of about 0.8 mm, the pivoting of piston unit 63 that inevitably occurs during its axial movement makes substantially no effect on the amount of magnetic force that is detected by magnaflux detector 61, which increases the performance of the sensor 500.

The entire contents of Japanese Patent Application 2005-225380 filed Aug. 3, 2005 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A shift position sensor of an automated manual transmission, the transmission having a shift actuator that includes a cylinder and a piston that moves in the cylinder in accordance with a speed change operation of the transmission, the shift position sensor comprising:
a magnet mounted in the piston to move therewith; and
a magnaflux detector mounted to a fixed member of the transmission near the shift actuator to detect a magnaflux produced by the magnet,
wherein the cylinder is constructed as to cover the magnet even when the piston is subjected to a stroke in the cylinder,
wherein the piston is connected to a shift bracket of the shift actuator to move therewith, the connection between the piston and the shift bracket permitting a predetermined circumferential play of the piston about an axis of the piston, and
wherein the magnet comprises two magnet pieces that are spaced from each other in an axial direction of the piston by a distance that is greater than a stroke distance of the piston.

2. A shift position sensor as claimed in claim 1, in which each of the magnet pieces has a sector cross section concentric with the axis of the piston, and in which a radian defined by circumferentially opposed sides of the sector cross section of each magnet piece is determined greater than an angular range that the predetermined circumferential play of the piston takes.

3. A shift position sensor as claimed in claim 1, in which each magnet piece has an even thickness and is evenly magnetized in a radial direction.

4. A shift position sensor as claimed in claim 1, in which each of the magnet pieces has a generally radii cross section of which inner concave part and outer convex part are substantially the same in length, and in which each magnet piece has an even thickness and is evenly magnetized in a straight direction.

5. A shift position sensor as claimed in claim 1, in which each of the magnet pieces has a generally radii cross section, in which an inner concave part of the radii cross section is longer than an outer convex part of the radii cross section so that a thickness of a circumferentially central portion of the respective magnet piece is smaller than that of circumferentially opposed portions of the respective magnet piece, and in which the respective magnet piece is unevenly magnetized in a straight direction.

6. A shift position sensor as claimed in claim 1, in which each of the magnet pieces has a generally rectangular cross section and has an even thickness, and in which the respective magnet piece is evenly magnetized in a straight direction.

7. A shift position sensor as claimed in claim 6, in which the respective magnet piece is provided with a rectifying plate at a side thereof that faces toward the magnaflux detector.

8. A shift position sensor as claimed in claim 1, in which the transmission includes a first clutch that is engaged when establishing odd number speeds, a second clutch that is engaged when establishing even number speeds and in which the shift actuator is one of shift actuators that establish the odd and even number speeds.

9. A shift position sensor of an automated manual transmission, the transmission having a hydraulic shift actuator that includes a cylinder, a piston that moves in the cylinder in accordance with a speed change operation of the transmission, the piston being connected to a shift fork and moving the same to a desired position to achieve a given speed when the cylinder is fed with a pressurized fluid in response to the speed change operation,
the shift position sensor comprising:
a magnet unit installed in the piston to move therewith; and
a magnaflux detector mounted to a fixed member of the transmission at a position to face a side wall of the cylinder to detect a magnaflux produced by the magnet unit,
wherein the cylinder is constructed to cover the magnet unit even when the piston is subjected to a stroke in the cylinder, and
wherein the magnet unit comprises:
two magnets that are installed and aligned in the piston leaving a given space therebetween; and
a yoke axially extending between the two magnets at a position opposite to the magnaflux detector with respect to the two magnets, the yoke being constructed of a magnetic metal.

10. A shift position sensor as claimed in claim 9, in which the fixed member is a case of the hydraulic shift actuator.

11. A shift position sensor as claimed in claim 9, in which the piston is connected to the shift fork through a shift bracket and a shift rod, the shift bracket being pivotally connected to the piston in a manner to permit a predetermined circumferential play of the piston about an axis of the piston.

12. A shift position sensor as claimed in claim 9, in which each of the two magnets has a sector cross section and is received in the piston with its major surface oriented perpendicular to an axis of the piston.

13. A shift position sensor as claimed in claim 12, in which a radian defined by circumferentially opposed sides of the sector cross section of the respective magnet with respect to an axis of the piston is set greater than an angular range that a predetermined circumferential play of the piston takes.

14. A shift position sensor as claimed in claim 9, in which a distance between the two magnets is greater than a stroke of slide of the piston.

15. A shift position sensor as claimed in claim 13, in which the circumferentially opposed sides of the sector cross section of the respective magnet are in agreement with a radial direction of the piston, and in which the respective magnet has an even thickness throughout the entire construction thereof and is evenly magnetized in a radial direction.

16. A shift position sensor as claimed in claim 13, in which the length of inner concave part and that of outer convex part of the sector cross section of the respective magnet are substantially the same, and the respective magnet has an even thickness throughout the entire construction thereof and is evenly magnetized in substantially straight direction.

17. A shift position sensor as claimed in claim 16, in which the outer convex part of the sector cross section of the respective magnet is shaped concentric with the axis of the piston, and in which the respective magnet has an even thickness throughout the entire construction thereof and is evenly magnetized in substantially straight direction.

18. A shift position sensor as claimed in claim 17, in which the inner concave part of the sector cross section of the respective magnet is longer than that of the outer convex part.

19. A shift position sensor as claimed in claim 9, in which each of the two magnets has a rectangular cross section and is received in the piston with its major surface oriented perpendicular to an axis of the piston, and in which the respective magnet has an even thickness throughout the entire construction thereof and is evenly magnetized in substantially straight direction.

20. A shift position sensor of an automated manual transmission, the transmission having a hydraulic shift actuator that includes a cylinder, a piston that moves in the cylinder in accordance with a speed change operation of the transmission, the piston being connected to a shift fork and moving the same to a desired position to achieve a given speed when the cylinder is fed with a pressurized fluid in response to the speed change operation, the shift position sensor comprising:

a magnet unit installed in the piston to move therewith; and a magnaflux detector mounted to a fixed member of the transmission at a position to face a side wall of the cylinder to detect a magnaflux produced by the magnet unit, wherein the cylinder is constructed to cover the magnet unit even when the piston is subjected to a stroke in the cylinder, and wherein each of the two magnets has a rectangular cross section and is received in the piston with its major surface oriented perpendicular to an axis of the piston, and in which the respective magnet has an even thickness throughout the entire construction thereof and is evenly magnetized in substantially straight direction, and wherein each magnet is provided at a radially outer leading end thereof with a rectifying iron plate.

\* \* \* \* \*